United States Patent [19]

Buelens

[11] 4,291,802
[45] Sep. 29, 1981

[54] LIGHT-TIGHT CASSETTE

[75] Inventor: Edward Buelens, Kontich, Belgium

[73] Assignee: AGFA-GEVAERT N.V., Mortsel, Belgium

[21] Appl. No.: 129,983

[22] Filed: Mar. 13, 1980

[30] Foreign Application Priority Data

Mar. 15, 1979 [GB] United Kingdom ............... 09182/79

[51] Int. Cl.³ ...................... G03B 17/26; B65H 19/02
[52] U.S. Cl. .................................. 206/409; 242/71.1; 242/71.7; 220/345; 220/355
[58] Field of Search ...................... 206/409, 408, 407; 220/353, 355, 345, 8; 242/55.53, 71.1, 71.7; 430/495, 500, 501; 354/275, 277; 225/52

[56] References Cited

U.S. PATENT DOCUMENTS 3,612,424 10/1971 Friedel ........................... 242/71.7 X
3,756,392 9/1973 Oehlmann ....................... 206/407 X
4,068,247 1/1978 Bouwen et al. ................. 242/71.1 X
4,239,164 12/1980 Barnsbee et al. ............... 206/409 X Primary Examiner—Steven M. Pollard
Attorney, Agent, or Firm—William J. Daniel

[57] ABSTRACT

A light-tight cassette for holding and dispensing a roll of light-sensitive material and comprising an extrusion moulded shell or casing (11) and injection moulded end caps (12,13).

Difficulties which may arise in fitting the end caps upon the ends of the shell are avoided by providing the inner face of the end caps with axially projecting corner tongues (26,27,28) shaped in a three-dimensional form having outwardly facing surfaces which are outwardly convexly curved both in radial planes passing through the axis of the hub portion (44) of the cap and in planes normal to said axis. These corner tongues fit inside corner regions of the shell and have a self-centering action when the caps and shell are pushed together in abaxial and/or relatively angularly skewed relationship.

10 Claims, 8 Drawing Figures

LIGHT-TIGHT CASSETTE

The present invention relates to a light-tight cassette or magazine (hereafter called "cassette") for holding a roll of light-sensitive photographic material.

The invention is particularly applicable to a cassette for holding and dispensing a roll of photographic material for use in phototype-setting apparatus.

Cassettes for holding and dispensing a roll of light-sensitive material are known which are in the form of a rectanguloid box-like casing comprising a four-sided shell with end closure walls having central hub portions for rotatably supporting the roll within the casing. At least one of the end walls of such known cassettes is formed by a detachable end cap which has spaced inner and outer peripheral wall portions defining a peripheral groove for receiving an end portion of the shell, and which at corner regions thereof has axially projecting corner flanges extending from the inner face of the inner wall of such peripheral groove at such corner regions to fit inside corner regions of an end of the shell.

These flanges serve as guide portions to facilitate fitting the end cap or end caps to the shell. When fitting the cap, its projecting corner flanges enter the shell before the shell end margins seat within the peripheral groove and thus facilitate correct angular orientations of the cap relative to the shell preparatory to such entry.

If the cassette is intended to be disposed of after being emptied, the end cap or caps can be permanently secured to the shell of the cassette by the manufacturer of the photographic material after loading the cassette. But if the cassette is intended to be reloaded and re-used, at least one end cap must be detachably secured to the shell so that it can readily be removed and re-fitted.

It has been found that the corner flanges of said known cassette caps are not always satisfactory for ensuring easy fitting of the caps. Difficulties in fitting occur in particular if the cassette shell is very easily deformable due, e.g. to its manufacture in the form of a very cheap plastics extrusion. In such circumstances appreciable distortions of the truly rectanguloid form of the shell may occur such that even a skilled person needs several seconds in order properly to fit each cap onto the shell. The ease with which the closure of necessarily light-tight cassettes can be achieved is of practical importance both to suppliers of loaded cassettes and to end users who may wish to load or re-load such cassettes in a dark room as mentioned already.

The present invention provides a cassette which is of the general kind described and is constructed so as further to facilitate closure of the cassette.

According to the present invention, there is provided a light-tight cassette for holding and dispensing a roll of light-sensitive material, said cassette being in the form of a rectanguloid box-like casing comprising a four-sided shell with end closure walls having central hub portions for rotatably supporting the roll within the box, the shell having a peripheral exit slot through which light-sensitive material can be drawn from the roll and at least one of said end walls being formed by a detachable end cap which has spaced inner and outer peripheral wall portions defining a peripheral groove for receiving the end margins of the shell and which at corner portions thereof has axially projecting guide tongues or flanges which fit inside corner regions of the corresponding end of the shell and provide extensions of the inner face of the inner wall of such peripheral groove, characterised in that each of said guide tongues has a three dimensional configuration defining an outwardly facing surface which is outwardly convexly curved both in radial planes passing through the axis of its hub portion and in transverse planes normal to that axis whereby the guide tongues provide a self-centering effect when the cap and shell are pushed together in abaxial and/or relatively angularly skewed relationship.

It has been found that corner guide flanges of this special form not only facilitate closure of the cassette, even when its rectanguloid shape is somewhat deformed, but also afford the supplementary advantage that the corner portions of the cap are considerably stiffened. This is of particular importance if the end caps are moulded from a material that has a relatively low stiffness, such as for instance polypropylene. Yet polypropylene is a material that is quite attractive in itself since it is cheaper and is less toxic when burned than commonly used materials such as high impact polystyrene and polyvinylchloride.

In certain embodiments of the invention there is at least end cap is a moulded plastic component having a corrugated cross-sectional profile which provides around the hub portion a series of radial ribs projecting alternately internally and externally of the cap, and the cap carries abutment faces against which ejector pins associated with an injection moulding unit can press for ejecting the cap from a mould, these abutment faces being located at corner regions of the cap between internally projecting radial ribs and at a level which is within the height, i.e., axial dimension, of such ribs. This arrangement of abutment faces has two consequences. Firstly, any deformations of such faces caused by the pressure exerted by the ejector pins will not be so apparent as they would be if said abutment faces were located at the level of the externally facing side of the end wall of the cap. Secondly, any such deformations will be out of contact with the adjacent end of a roll of material when this is rotatably supported in the cassette so that there is no risk of damaging the longitudinal edge of the photographic material by rubbing contact with such deformations.

Advantageously, each of these abutment faces is provided by a portion of the end cap which is contiguous with an axially projecting guide tongue located at the corresponding corner of the cap. The stiffness of the cap is still further increased by this feature.

Preferably the exit slot for the photographic material is located at or in the vicinity of a corner of the shell and has inwardly directed lips defining an exit passage; at one corner of each detachable cap, there is no axially projecting guide tongue and the inner one of the peripheral wall portions defining the peripheral groove in the cap is interrupted at that corner to provide a gap for accommodating the end portions of these lips; and the regions of the inner peripheral wall portion adjacent of the gap have a height which decreases towards that gap. This feature further contributes to easy fitting of the cap.

An embodiment of the invention selected by way of example, will now be described with reference to the accompanying diagrammatic drawings, in which.

Figure 1:
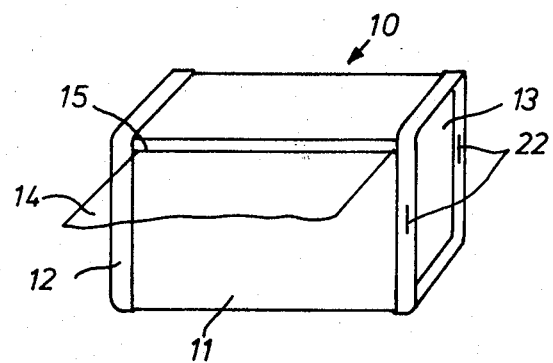
FIG. 1 is a perspective view of one embodiment of a cassette according to the invention.

Referring to FIG. 1, a cassette 10 for holding a roll of light-sensitive photographic material comprises a shell or casing 11 and two end caps 12 and 13. The web of photographic material 14 is pulled through an exit slot 15 which extends between the two end caps. In the figure, the photographic material has been illustrated as being transparent.

Figure 2:
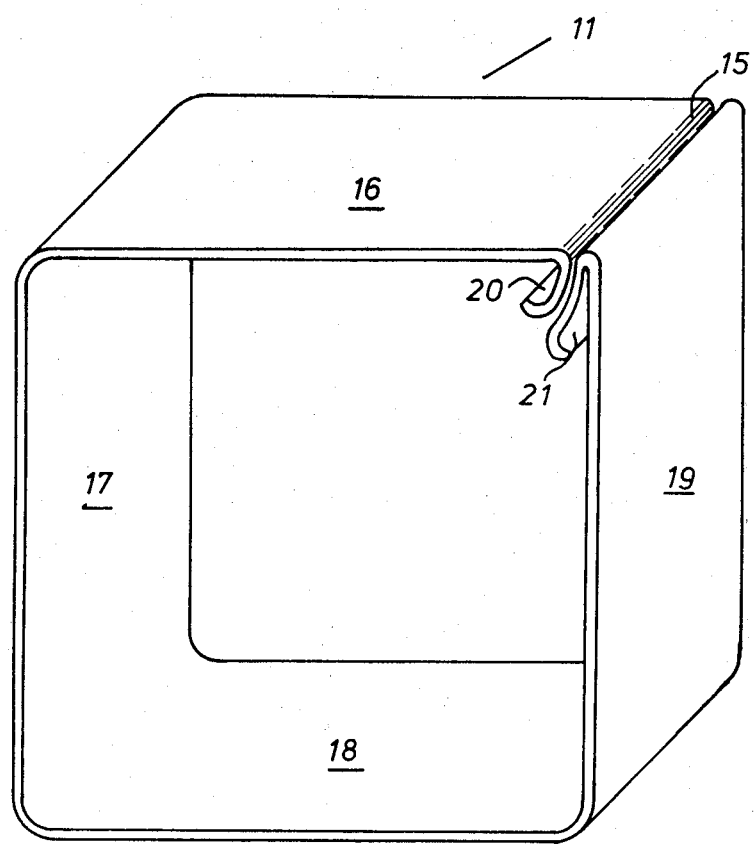
FIG. 2 is a perspective view of the shell or casing of such cassette.

The shell portion is illustrated in detail in FIG. 2, and comprises four flat walls 16 to 19 joined by rounded corner portions and two lip portions 20 and 21 defining an exit slot 15. A strip of resilient material such as velvet or felt may be used to line the opposed surfaces of the lips 20 and 21 so as to light-tightly seal the cassette and to provide a smooth passageway for the photographic material. The lips are curved as shown in order to provide a flared entrance to the exit slot promoting smooth travel of the web as it is pulled from a nearly consumed roll. In addition, the curved lips considerably increase the resistance of the exit slot 15 to deformation. The feature is very important in the case of cassettes of a relatively great length.

The shell 11 lends itself particularly to manufacture from plastics by extrusion. This manufacturing technique enables shells of any required length to be cut from an extruded length of appropriate cross-sectional profile. Suitable plastics for the shell portion are, e.g., polyvinyl chloride and polyethylene.

The end caps 12, 13 may be fastened to the shell by any known technique, e.g. by glueing or taping. In the embodiment illustrated in FIG. 1 the caps are initially secured to the shell portion by means of staples 22 which have been clinched against the inner peripheral wall portions of the end caps. This method is very cheap and effective. The stapling does not cause loss of light-tightness of the cassette and it has surprisingly been found that the cassette remains light-tight even when the staples have been removed in spite of the plurality of small holes left in the outer and inner peripheral wall portions of the end caps and in the end portions of the shell. It is believed that this is due to the deep fitting of the shell end portions in the peripheral groove of the end caps.

In spite of the asymmetry of the lips of the shell, the latter is closed by two identical end caps. Each end cap has the form shown in FIGS. 3 to 8. The end cap comprises an end wall having inner and outer peripheral wall portions 23 and 24 defining a peripheral groove 25 for receiving the end margins of the shell. The cap has three axially projecting corner guide tongues 26, 27 and 28 which fit into corner regions of an end of the shell.

Figures 3, 4:
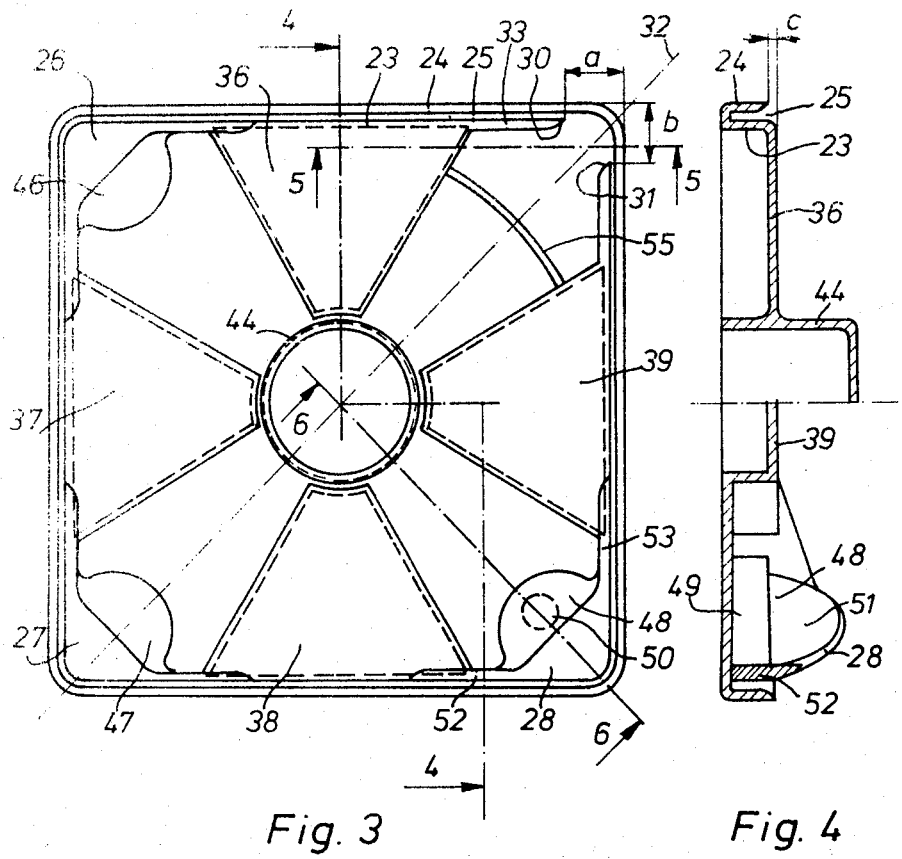
FIG. 3 is a plan view of the inner side of an end cap for such cassette.
FIG. 4 is a section on line 4—4 of FIG. 3.
Figures 5, 6:
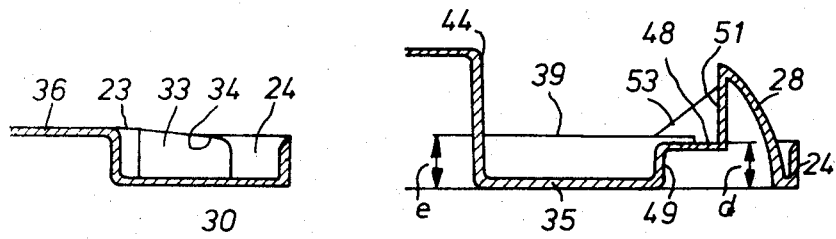
FIG. 5 is a section on line 5—5 of FIG. 3.
FIG. 6 is a section on line 6—6 of FIG. 3.
Figure 7:
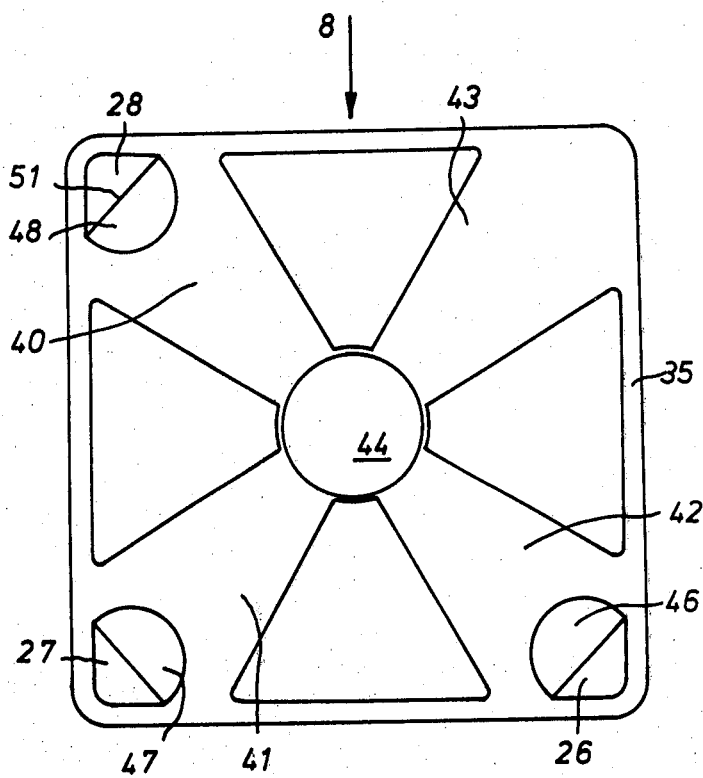
FIG. 7 is a plan view of the outer side of an end cap of the cassette.
Figure 8:
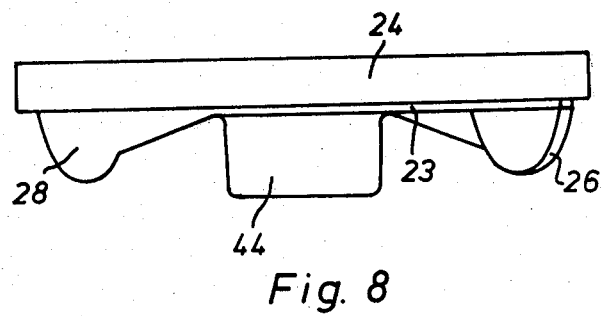
FIG. 8 is a side view of the end cap seen according to arrow 8 in FIG. 7.

Each of these corner guide tongues is of a three-dimensional form having an outwardly facing surface which is outwardly convexly curved both in radial planes containing the axis of the cap and in planes normal to said axis, that is, both peripherally and radially inwardly, as may be clearly seen in the sectional views of FIGS. 4 and 6. The tongues when in this configuration have a self-centering action when the cap and the shell are moved together in abaxial and/or relatively angularly skewed relationship when the assembling of the cassette. The inner peripheral wall portion 23 is interrupted at the corner of the cap where no such corner guide tongue is provided (the top right hand corner of FIG. 3) to provide a gap for accommodating the corresponding end portions of the lips 20, 21 of the shell. The edges 30, 31 abreast of the gap are equally spaced from a diagonal 32 of the end cap, the spacing being represented as dimensions a and b in FIG. 3, those dimensions being equal. The diagonal 32 is an axis of symmetry of the cap. The edge 30 of the interrupted inner peripheral wall portion 23 passes between the shell wall 16 and the lip 20, whereas in the case of the other end cap it is the edge 31 which passes between that particular shell wall and lip. As appears in FIG. 5, an end region 33 of the inner peripheral wall portion 23 has a top edge 34 which slopes downwardly to the edge 30. The end region of the peripheral wall portion 23, terminating in the edge 31 is similarly shaped. The bevelling of such end regions of the inner peripheral wall portion 23, like the described shaping of the three-dimensional guide tongues at the other three corners of the cap, contributes to a centering by smoothly guiding the end of the shell into the peripheral groove 25 when the cap and the shell are moved together.

Each end cap has an end wall 35 formed with radial ribs 36 to 39 projecting at the inside of the cap and intervening ribs 40 to 43 projecting at the outside of the cap. The hub 44 of the cap is hollow and is formed by a central portion upset from said end wall. In consequence the cap has a high rigidity in relation to the amount of material used in its construction. The ribs 36 to 39 provide abutment faces for an end of the roll of photographic material when in position in the cassette. The ribs offer a substantial contact area for the roll, which reduces the risk of damage to that material and of wear of the ribs.

The inner faces of the inwardly directed ribs 36 to 39 are proud of, i.e. project inwardly beyond the inner edge of the outer peripheral wall portion or flange 24, as indicated by the distance c in FIG. 4, and the photographic material can therefore be pulled from the cassette without risk for the edges of the photographic material running against that flange.

In case an end cap of the form described is moulded from a rather soft plastic material, such as for instance polypropylene, it may occur that the ejector pins used for ejecting the moulded cap from the mould leave bearing marks in the form of small indentations or other deformations of the cap. If the caps were moulded so that the ejector pins contacted the outside face of the cap, such bearing marks would detract from the appearance of the cap. It is therefore preferable for the cap to be moulded so that the ejector pins contact the inside face of the cap.

In the illustrated embodiment the end cap has internal abutment faces against which the ejector pins can bear for ejecting the cap from a mould, each abutment faces being located at corner regions of the cap between internally projecting radial ribs and at a level, i.e. a transverse plane, which is within the height, i.e. the axial dimension, of such ribs.

Referring to FIGS. 3, 4, 6 and 7, abutment faces 46, 47 and 48 are provided by semi-cylindrical portions or steps of the moulding which are contiguous with the corner guide tongues 26, 27 and 28. FIGS. 4 and 6 show the form of one of those semi-cylindrical steps, 49. The others are identical. The level of the abutment faces is indicated by d in FIG. 6 from which it is apparent that that level is below the level e of the inside face 39 of the end cap. In consequence any ejector pin bearing mark 50 such as is represented in broken lines at the lower right corner in FIG. 3 will be well below or inside the roll supporting faces of the ribs 36 to 39. The semi-cylindrical steps such as 49, being integral and contiguous with the corner guide tongues 26, 27 and 28, provide additional structural strength to the cap. The reinforcing or buttressing effect of the semi-cylindrical steps is contributed to by the integration of those steps with the flat part-elliptical inner walls of such guide tongues. FIGS. 4 and 6 show the inner wall 51 of corner guide tongue 28.

The corner guide tongues have integral flank portions sloping downwardly, i.e. axially outwardly, from near the tips of those guide tongues to the inside radial ribs. In FIGS. 3 and 6 the flanks of corner guide portion 28 are marked 52. They slope downwardly to the radial ribs 38, 39. The flanks of all of the corner guide tongues are the same. They further improve the guidance of the cap when it is being fitted to the shell and they further increase the strength of the cap.

The end cap has a slightly convexly curved wall 55 extending between the internal radial ribs 36 and 39 near the corner where the lips 20, 21 of the shell are accommodated. This wall 55, which has a height equal to the height e of the ribs (see FIG. 6), forms an extra barrier against the entry of light into the cassette through the corresponding end portion of the film exit slot 15. The internal faces of the cap in the zone between wall 55 and the corner where the lips 20, 21 of the shell are accommodated may be pebbled or otherwise roughened in order to absorb any light that might enter the cassette near through that end portion of the slot 15.

Both of the end caps can be removably fitted to the shell or one of them can be permanently secured to the shell before loading the cassette with photographic material, leaving the other end cap to be permanently or removably fitted after such loading.

A cassette according to the present invention and manufactured from plastic material and having a wall thickness of 1 to 2 mm can in itself be sufficiently moisture-proof for the purposes primarily intended. In the case of certain types of photographic material which are particularly sensitive to moisture, the cassette containing a roll of fresh material may be hermetically sealed in a conventional laminated wrapper consisting of bonded layers of paper, aluminium and polyethylene. Such wrapper will provide effective protection against moisture during normal storage of the cassette. For reloading a cassette by the user, fresh rolls of photographic material can be supplied, by the manufacturer of such materials, in such a moisture-proof wrapper.

We claim:

1. A light-tight cassette for holding and dispensing a roll of light-sensitive material, said cassette being in the form of a rectanguloid casing comprising a four-sided shell with end closure walls having central hub portions for rotatably supporting said roll within the casing, the shell having a peripheral exit slot through which light-sensitive material can be drawn from said roll and at least one of said end walls being formed by a separate end cap which has spaced inner and outer peripheral wall portions defining a peripheral groove for receiving the end margins of the shell to hold the cap in place thereon and at corner sections thereof has axially projecting guide tongues which when the cap is in place fit inside corner regions of the corresponding end of the shell and constitute extensions of the inner face of the inner wall of such peripheral groove, characterised in that each of said guide tongues has a three-dimensional configuration defining an outwardly facing surface which is outwardly convexly curved both in radial planes passing through the axis of its hub portion and in transverse planes normal to said axis whereby said guide tongues provide a self-centering effect when the cap and shell are pushed together in abaxial and/or relatively angularly skewed relationship.

2. A light-tight cassette according to claim 1 including an axially projecting guide tongue at only three of four corners of each said cap.

3. A light-tight cassette according to claim 1, having at least one such end cap which is a moulded plastic component having a stepped cross-sectional profile which provides around the hub portion a series of radial ribs ehich project alternately internally and externally of the end wall of the cap, and includes abutment faces against which ejector pins can press for ejecting the cap from a mould, said abutment faces being located at corner regions of the cap between internally projecting radial ribs and at a level which is within the axial dimension of such ribs.

4. A light-tight cassette according to claim 3, wherein each of said abutment faces is provided by a portion of the end cap which is contiguous with said axially projecting guide tongues located at the corresponding corner of the cap.

5. A light-tight cassette according to claim 4, wherein each of said abutment faces has a generally semi-circular shape.

6. A light-tight cassette according to claim 3, wherein each end cap has on its inner side a wall portion which extends between radial ribs at that side of the cap and across the path of any light travelling along the inside face of the end cape from an end of the said peripheral slot in the casing.

7. A light-tight cassette according to claim 1, wherein the exit slot for the photographic material is located adjacent a corner of the casing and has inwardly directed lips defining an exit passage in the casing periphery; at one corner of each cap there is no axially projecting guide portion and the inner one of the peripheral wall portions defining the peripheral groove in said cap is interrupted at that corner to provide a gap for accommodating the end portions of said lips; and the regions of said inner peripheral wall portion adjacent said gap have a height which decreases towards that gap.

8. A light-tight cassette according to claim 1, wherein each said end cap is secured to the casing by means of staples.

9. A light-tight cassette according to claim 1, wherein each said end cap is made of injection moulded polypropylene.

10. A light-tight cassette according to claim 1, wherein the said shell is extruded of polypropylene.

* * * * *